United States Patent [19]

Noguchi et al.

[11] Patent Number: 4,832,772

[45] Date of Patent: May 23, 1989

[54] METHOD FOR SURFACE TREATMENT OF FILM

[75] Inventors: Takehiko Noguchi, Nagaokakyo; Yoshiki Takeoka, Osaka; Tsuneo Yamamoto, Ohtsu, all of Japan

[73] Assignee: Kanegafuchi Kagaku Kogyo Kabushiki Kaisha, Osaka, Japan

[21] Appl. No.: 202,299

[22] Filed: Jun. 6, 1988

Related U.S. Application Data

[63] Continuation-in-part of Ser. No. 012,233, Feb. 9, 1987, abandoned.

[30] Foreign Application Priority Data

Feb. 10, 1986 [JP] Japan .................................. 61-27391

[51] Int. Cl.⁴ ........................ B32B 31/12; B32B 31/16
[52] U.S. Cl. ..................................... 156/153; 15/100; 15/103.5; 156/155; 156/281; 156/344
[58] Field of Search ............... 15/100, 103.5; 156/153, 156/155, 281, 344

[56] References Cited

U.S. PATENT DOCUMENTS 1,949,868  3/1934  Keuffer ................................. 15/100
4,010,514  3/1977  Fischer et al. .................... 15/100 X Primary Examiner—Robert A. Dawson
Attorney, Agent, or Firm—Armstrong, Nikaido, Marmelstein & Kubovcik

[57] ABSTRACT

There is provided a method for plastic film surface treatment for improving printability and adhesion properties which comprises feeding a plastic film and a wiping web in the opposite direction to each other in a ratio of the film running speed to the wiping web running speed being 1/1 to 100/1 and bringing them into contact with each other between knip rolls under a proper pressure, whereby a weak layer containing oligomers and additives is wiped off from the plastic film surface. The treatment improves the printability and adhesion of film inexpensively in a stable manner without being affected by the varied properties of film to be treated and also without deteriorating the physical properties of the film.

7 Claims, 1 Drawing Sheet

METHOD FOR SURFACE TREATMENT OF FILM

The present application is a continuation-in-part of application Ser. No. 012,233, filed Feb. 9, 1987, now abandoned.

BACKGROUND OF THE INVENTION

1. Field of the Invention

The present invention relates to a method for surface treatment of film. More particularly, it relates to an economical method of film surface treatment for the improvement of printability and adhesion properties.

2. Description of the prior Art

There are many instances where plastics film undergoes surface treatment for the improvement of printability and adhesion properties.

The conventional methods of surface treatment for this purpose include sand blasting, wet cleaning, corona discharge treatment, plasma treatment, and so forth. Each of them has a disadvantage of its own. Sand blasting deteriorates the physical properties of the material treated and consequently its use is limited. In addition, it is expensive to carry out. Wet cleaning needs a waste water disposal unit, which makes the treatment expensive. Corona discharge treatment involves difficulty in performing stable operation on account of the variation of surface properties of the web to be treated. Plasma treatment also involves difficulties arising from the operation to be performed in a vacuum. In addition, it is expensive to carry out.

SUMMARY OF THE INVENTION

It is an object of the present invention to provide a method for surface treatment of plastics film for the improvement of printability and adhesion properties, said method being performed inexpensively in a stable manner without being affected by the varied properties of film to be treated.

It is another object of the present invention to provide a method of treating plastics film without roughening the film surface and hence without deteriorating the physical properties of the film.

Other and further objects, features, and advantages of the invention will appear more fully from the following description.

With the foregoing in mind, the present inventors carried out a series of researches which led to the finding that if the weak layer on the film surface is mechanically wiped off, the difficulties involved in the prior art technology can be solved and the above-mentioned objects can be achieved. The present invention was completed on the basis of this finding.

DETAILED DESCRIPTION OF THE INVENTION

Figure 1:
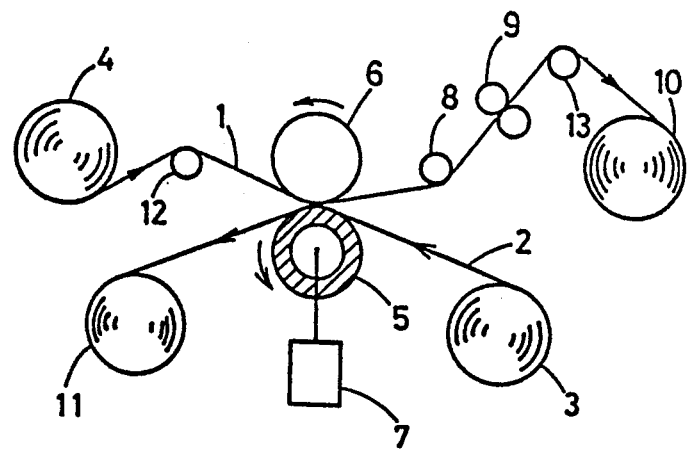
FIG. 1 is a schematic diagram showing an example of the apparatus used in the invention.

The gist of the invention resides in a method for plastic film surface treatment for improving printability and adhesion properties which comprises feeding a plastic film and a wiping web in the opposite direction to each other in a ratio of the film running speed to the wiping web running speed being 1/1 to 100/1 and bringing them into contact with each other between knip rolls under a proper pressure, whereby a weak layer containing oligomers and additives is wiped off from the plastic film surface.

The method of the invention can be applied to a variety of known plastics film, preferably film of condensation polymer such as polyester film, polyamide film, and polyimide film. Most desirable among them is polyimide film.

It is empirically known that there is a weak layer on the plastics film surface which is formed by the bleeding of stabilizers and other additives. In the case of film of condensation polymers, the oligomer is an important constituent of the weak layer. Particularly in the case of polyimide film produced by solution casting, the bleeding of oligomer takes place rapidly. This weak layer interferes with printing and adhesion, and therefore it is necessary to remove this weak layer.

According to the method of the invention, the weak layer is mechanically wiped off by rubbing the plastics film surface with paper, cloth, or the like. This process is explained with reference to FIG. 1, in which there are shown a film (1) for surface treatment, a rolled continuous wiping web (2) such as paper and cloth, a payoff (3) for the wiping web, a payoff (4) for the film, a first nip roll (5) to press the wiping web against the film, a second nip roll (6) to support the film, an air cylinder (7) to adjust the pressure of the first nip roll, an expander roll (8) to eliminate wrinkles, a pair of nip rolls (9) to relieve tension, a take-up (10) for the film, a take-up (11) for the wiping web, and supporting rolls (12) and (13). When the apparatus is in operation, the film (1) and the wiping web (2) are opposed to each other between a pair of nip rolls (5, 6) under a proper pressure adjusted by the air cylinder (7), whereby the surface weak layer of the film (1) is wiped off by the wiping web (2).

What is important in the operation of the apparatus is as follows:

(1) The wiping web such as paper and cloth should be fed at a proper speed so that the weak layer removed from the film does not redeposit on the film.

(2) The wiping web should be selected from materials which do not damage the film surface.

(3) The nip pressure should be high enough to remove the weak layer but should not be too high to damage the film. The wiping should not necessarily be performed in dry process: but the combination of dry process and wet process is possible, in which case the removal of the weak layer is promoted by the use of a proper solvent such as toluene, trichloroethylene, and chloroform which dissolves or swells the weak layer.

In this process the following conditions should be properly established by experience. The material of the wiping web, the running speed of the plastics film, the running speed of the wiping web, the difference between the two speeds, the nip pressure, and the material and hardness of the nip rolls.

Suitably, however, the speed of the plastic film is 0.1 to 100 m/min., the speed of wiping web is 0.01 to 30 m/min., the ratio of the plastic film speed to the wiping web speed is 1/1 to 100/1, the nip pressure is 5 to 100 kg/m, the nip rolls are of metal but more preferably, one is a metal roll and the other a rubber roll, and the heardness of any rubber roll is 70 to 100. If the wiping web speed is smaller than the ratio of 100/1, i.e., the plastic film speed amounts to as great as several hundred meters per minute, wrinkles occur on the surface of the film and thus the obtained film can not be utilized practically, and inversely, if the wiping web speed is greater than the ratio of 1/1, the consumption amount of the wiping web increases, which is not practical.

The method for surface treatment disclosed herein is effective to improve the surface characteristics such as printability and adhesion. Needless to say, the method can be used in combination with other known method for surface treatment, if necessary.

The method of the invention permits the surface treatment to be performed at a low cost in a stable and simple manner regardless of the properties of the film to be treated. In addition, the method of the invention mechanically remove the weak layer without roughening the film surface. It is based on a new idea which is not conceived from the known conventional method for surface treatment.

The invention is now described in more detail with reference to the following examples and comparative examples, which are not intended to limit the scope of the invention.

EXAMPLE 1-3

The surface treatments of 25-μm thick polyimide films were carried out using an apparatus similar to that shown in FIG. 1.

The wiping web was kraft paper (KPT 145 made by Tomoegawa Paper Mfg. Co., Ltd.). The apparatus was run under the following conditions.
Nip pressure: 36 kg/m width
Film speed: shown in Table 1
Paper speed: shown in Table 1 (in the opposite direction of film)
Nip roll for paper: rubber roll
Nip roll for film: hard chrome plated roll
The surface-treated films were examined for adhesion. The results are shown in Table 1.

COMPARATIVE EXAMPLE 1

The 25-μm thick polyimide film was subjected to the surface treatment in the same way as in Example 1, except that the film speed and the paper speed were varied. The surface-treated film was examined for adhesion. The results are shown in Table 1.

COMPARATIVE EXAMPLES 2 to 6

The 25-μm thick polyimide films used in Example 1 were examined for adhesion after the following surface treatment.
(1) No surface treatment.
(2) Matte-finishing
(3) Alkali treatment
(4) Plasma treatment
(5) Corona discharge treatment
The results are shown in Table 1.

EXAMPLE 4

The surface treatment for 25-μm thick polyethylene terephthalate film was carried out in the same way as in Example 1, and treated film was examined for adhesion. The results are shown in Table 1.

COMPARATIVE EXAMPLES 7 and 8

The 25-μm thick polyethylene terephthalate films used in Example 1 were examined for adhesion after the following surface treatment.
(6) No surface treatment.
(7) Corona discharge treatment
The results are shown in Table 1.

TABLE 1

| Example No. | Film | Treatment | Film speed (m/min) | Paper speed (m/min) | Film/paper speed ratio | Adhesion strength (kg/cm) | Remarks |
|---|---|---|---|---|---|---|---|
| Example 1 | Polyimide | Mechanical wiping | 8 | 0.8 | 10/1 | 2.3 | No wrinkles |
| Example 2 | " | " | 30 | 0.3 | 100/1 | 2.1 | " |
| Example 3 | " | " | 3 | 3 | 1/1 | 2.3 | " |
| Comparative Example 1 | " | " | 100 | 0.3 | 333/1 | | Not measureable due to wrinkles |
| Comparative Example 2 | " | No treatment | — | — | — | 1.2 | Poor adhesion strength |
| Comparative Example 3 | " | Matte finishing | — | — | — | 2.7 | 20% decrease in tensile strength |
| Comparative Example 4 | " | Alkali treatment | — | — | — | 2.0 | Residual Na on surface detected by XPS |
| Comparative Example 5 | " | Plasma treatment | — | — | — | 3.0 | Wrinkles and other trouble |
| Comparative Example 6 | " | Corona treatment | — | — | — | 1.0-2.1* | Effect not uniform |
| Example 4 | Polyethylene terephthalate | Mechanical wiping | 8 | 0.8 | 10/1 | 2.2 | No wrinkles |
| Comparative Example 7 | Polyethylene terephthalate | No treatment | — | — | — | 1.0 | Poor adhesion strength |
| Comparative Example 8 | | Corona treatment | — | — | — | 1.0-2.1* | Effect not uniform |

*Varies depending on the lot and place measured.

Method for evaluation of adhesion:
Copper foil (1 ounce electrolytic copper)/adhesive 30 μm/film
Adhesive: nylon/epoxy adhesive
Curing condition: 120° C.×24 hours
Copper pattern width: 1.5 mm
90° peeling
Peel speed: 300 mm/min
Failure: at film/adhesive interface

What is claimed is:
1. A method for plastic film surface treatment for improving printability and adhesion properties which comprises feeding a plastic film and a wiping web in the opposite direction to each other with the ratio of the film running speed to the wiping web running speed being 1/1 to 100/1 and bringing them into contact with each other between nip rolls under a proper pressure, whereby a weak layer containing oligomers and additives is wiped off from the plastic film surface.

2. The method of claim 1, wherein the wiping web is paper.

3. The method of claim 1, wherein prior to the surface treatment, the plastic film surface is dissolved or swollen with a solvent.

4. The method of claim 2, wherein prior to the surface treatment, the plastic film surface is dissolved or swollen with a solvent.

5. The method of claim 1, wherein the nip pressure is 5 to 100 kg/m.

6. The method of claim 1, wherein one nip roll is metal and one nip roll is rubber.

7. The method of claim 6, wherein the rubber nip roll has a hardness of 70 to 100.

* * * * *